(12) United States Patent
Paulraj et al.

(10) Patent No.: US 12,425,400 B2
(45) Date of Patent: Sep. 23, 2025

(54) SECURE ACCESS VIA 802.1X PORT-BASED NETWORK ACCESS CONTROL (PNAC)

(71) Applicant: Dell Products, L.P., Round Rock, TX (US)

(72) Inventors: Deepaganesh Paulraj, Bangalore (IN); Lee E. Ballard, Georgetown, TX (US)

(73) Assignee: Dell Products, L.P., Round Rock, TX (US)

( * ) Notice: Subject to any disclaimer, the term of this patent is extended or adjusted under 35 U.S.C. 154(b) by 219 days.

(21) Appl. No.: 18/179,089

(22) Filed: Mar. 6, 2023

(65) Prior Publication Data

US 2024/0305633 A1    Sep. 12, 2024

(51) Int. Cl.
*H04L 9/40* (2022.01)
(52) U.S. Cl.
CPC .............................. *H04L 63/0876* (2013.01)
(58) Field of Classification Search
None
See application file for complete search history.

(56) References Cited

U.S. PATENT DOCUMENTS

| | | | | |
|---|---|---|---|---|
| 2020/0169548 A1* | 5/2020 | Yin | ........................ | H04W 12/03 |
| 2021/0110065 A1* | 4/2021 | Trivedi | .................... | G06F 21/85 |
| 2021/0328779 A1* | 10/2021 | Ruan | ..................... | H04L 9/0825 |
| 2022/0004627 A1* | 1/2022 | Smith | .................... | G06F 21/572 |
| 2022/0124118 A1* | 4/2022 | Bangalore Sathyanarayana | ......... | H04L 63/1416 |
| 2022/0292203 A1* | 9/2022 | Severns-Williams | ........................ | G06F 21/57 |
| 2023/0289433 A1* | 9/2023 | Kakaiya | .................. | G06F 21/74 |
| 2024/0111853 A1* | 4/2024 | Chu | ........................ | G06F 21/33 |
| 2024/0220298 A1* | 7/2024 | Powell | .................... | G06F 21/64 |

OTHER PUBLICATIONS

Yao J, Matusiewicz K, Zimmer V. Post Quantum Design in SPDM for Device Authentication and Key Establishment. Cryptography. 2022; 6(4):48. https://doi.org/10.3390/cryptography6040048 (Year: 2022).*

* cited by examiner

*Primary Examiner* — Rupal Dharia
*Assistant Examiner* — Shadi H Kobrosli
(74) *Attorney, Agent, or Firm* — Fogarty LLP

(57) ABSTRACT

Systems and methods provide an Information Handling System (IHS) comprising a host processor module configured to host at least one smart device and a secure control module configured to host a Baseboard Management Controller (BMC). The BMC validates identities and determine capabilities of the at least one smart device using Security Protocol and Data Model (SPDM) messages. The BMC sends a network access identity to the at least one smart device using an SPDM message. The BMC receives a request for a network connection from the at least one smart device, wherein the request includes the network access identity. The BMC performs authentication server functions to approve the network connection request. The BMC then sends a message to the at least one smart device indicating that a port or NC-SI channel is authorized for network access.

16 Claims, 3 Drawing Sheets

SECURE ACCESS VIA 802.1X PORT-BASED NETWORK ACCESS CONTROL (PNAC)

BACKGROUND

The Open Compute Project's (OCP) Datacenter-Modular Hardware System (DC-MHS) sub-project is directed to interoperability between elements of datacenter, edge, and enterprise infrastructure. DC-MHS provides consistent interfaces and form factors among modular building blocks. DC-MHS standardizes a collection of form-factors and supporting ingredients to allow interoperability between different platforms. The Security Protocol and Data Model (SPDM) specification defines messages, data objects, and sequences for performing message exchanges between devices over a variety of transport and physical media. The description of message exchanges includes authentication and provisioning of hardware identities, measurement for firmware identities, session key exchange protocols to enable confidentiality with integrity protected data communication and other related capabilities. Data center components may use SPDM messages to communicate.

SUMMARY

Embodiments are directed to using a Baseboard Management Controller (BMC) for provisioning an Extensible Authentication Protocol EAP device identity certificate to smart devices. The smart devices perform a supplicant role defined in an 802.1X Port-based Network Access Control (PNAC) standard. The BMC acts as both an Authenticator role and an Authentication Server role to facilitate guided secure access via the 802.1X standard. The identity certificate is sent to the smart devices using an SPDM AliasCert model to establish mutual SPDM trust between the BMC and smart devices. Multiple two-way connections between the smart devices and the BMC may be established using secure sessions for enhanced security. In other embodiments, inter-smart device private secure network connection may be provisioned with one smart device acting as an Authentication proxy and forwarding request to the BMC from a second smart device.

In one arrangement, an Information Handling System (IHS) comprises a host processor module configured to host at least one smart device and a secure control module configured to host a baseboard management controller. The baseboard management controller comprises at least one processor coupled to at least one memory. The at least one memory has program instructions stored thereon that, upon execution by the at least one processor, cause the baseboard management controller to validate identities and determine capabilities of the at least one smart device SPDM messages. The BMC sends a network access identity to the at least one smart device using an SPDM message. The BMC receives a request for a network connection from the at least one smart device, wherein the request includes the network access identity. The BMC performs authentication server functions to approve the network connection request. The BMC then sends a message to the at least one smart device indicating that a port is authorized for network access.

The BMC validate identities of the at least one smart device using an SPDM GET_CERTIFICATE message. The BMC determines capabilities of the at least one smart device using an SPDM GET_CAPABILITIES request message. The network access identity is sent in an SPDM SET_CERTIFICATE message. The SPDM SET_CERTIFICATE message includes an alias certificate with IEEE 802.1X credentials for the at least one smart device. The authentication server functions comprise processing RADIUS networking protocol messages by the baseboard management controller. The RADIUS networking protocol messages are defined in an IEEE 802.1X standard. The message indicating that a port is authorized for network access is an IEEE 802.1X standard EAP-Success packet.

BRIEF DESCRIPTION OF THE DRAWINGS

The present invention(s) is/are illustrated by way of example and is/are not limited by the accompanying figures. Elements in the figures are illustrated for simplicity and clarity and have not necessarily been drawn to scale.

DETAILED DESCRIPTION

Modular server architectures give cloud service providers a variety of compute choices to meet market and business conditions, to offer flexible configurations, and to deliver innovative solutions. The Datacenter-Modular Hardware System (DC-MHS) provides interoperability between datacenter, edge, and enterprise infrastructure using consistent interfaces and modular building blocks. DC-MHS standardizes various Host Processor Module (HPM) form factors and provides supporting elements for interoperability of HPMs across various platforms. The HPM is managed by a Datacenter-Secure Control Module (DC-SCM), which is designed to enable a common management and security infrastructure across platforms within a data center. The interface between the DC-SCM and the HPM is referred as the Datacenter-Secure Control Interface (DC-SCI).

The HPM is a traditional CPU-memory device with the Baseboard Management Controllers (BMC) and security functions moved to the DC-SCM. HPMs are not limited to a standard processor architecture and can apply any processor architecture utilizing management and security features.

Figure 1:
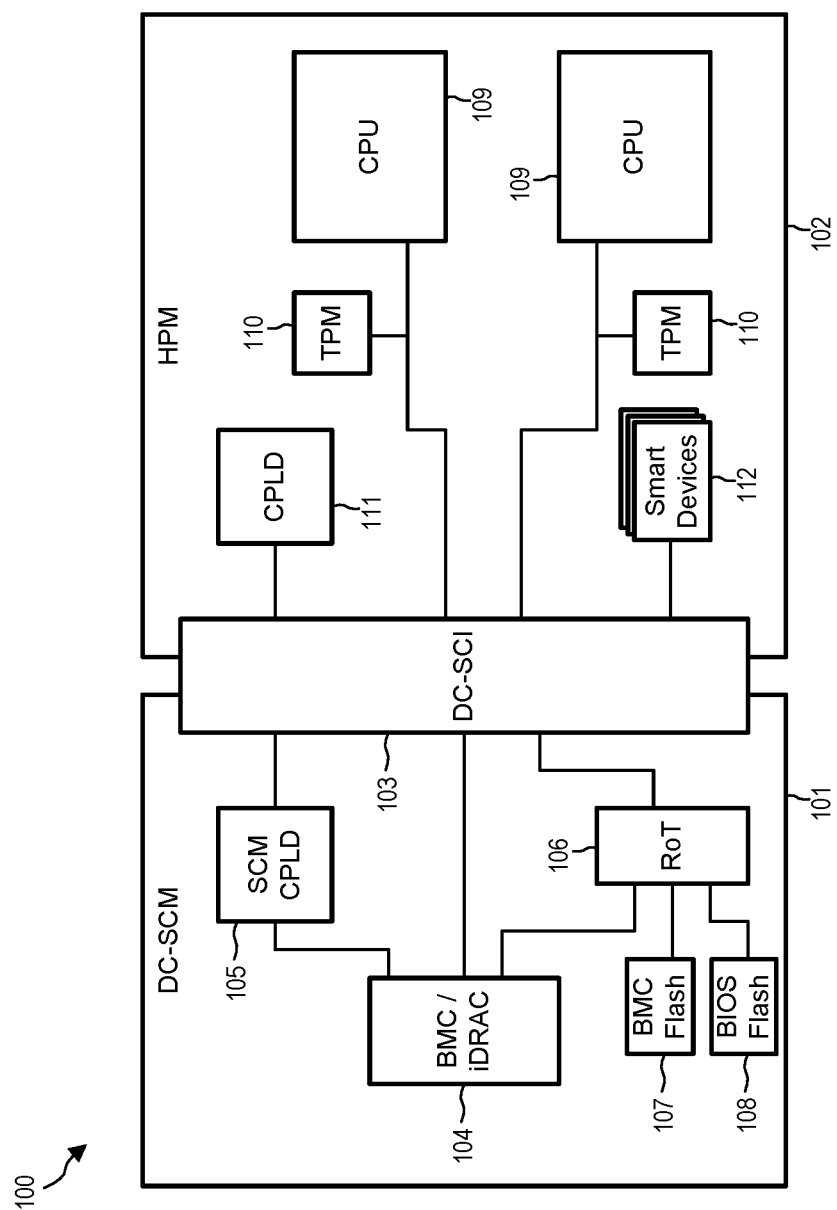
FIG. 1 is a block diagram illustrating multi-node building blocks of a Datacenter-Modular Hardware System.

FIG. 1 is a block diagram illustrating multi-node building blocks of a DC-MHS, such as components of a server or an Information Handling System (IHS) 100. DC-SCM 101 is coupled to HPM 102 via DC-SCI 103. The DC-SCM 101 consists of a BMC 104, which is a specialized service processor that monitors the physical state of the server. As a non-limiting example of a BMC 104, the integrated Dell Remote Access Controller (iDRAC) from DELL, INC. is embedded within DELL® PowerEdge servers and provides functionality that helps information technology (IT) administrators at a remote operations centers deploy, update, monitor, and maintain servers with no need for any additional software to be installed.

A complex programmable logic device (DC-SCM CPLD) 105 contains application specific logic and a high-speed and scalable Low-voltage differential signaling Tunneling Protocol & Interface (LTPI). A Roots of Trust (RoT) Security Processor 106 is responsible for attesting the BMC, BIOS, and/or other firmware images on the system. BMC Flash 107 consists of one or more flash devices used to contain the BMC firmware image. BIOS Flash 108 consist of one or more flash devices used to contain the BIOS firmware image for each node.

HPM 102 represents a general form factor that allows for maximum input/output (I/O) of CPUs 109 in the accessible slots. The HPM 102 form factor does not require a specific CPU 109 or memory technology. Various HPM 102 form factors support different numbers of CPUs. The HPM specifications are adapted to allow multiple generations of compute core designs to fit into the form factor specification so that chassis and system designs can be reused as desired.

Trusted Platform Modules (TPM) 110 provide hardware-based, security-related functions for CPUs 109 through integrated cryptographic keys. CPLD 111 supports data exchange between DC-SCM CPLD 105 and HPM 102 using LPTI. In other configurations, HPM 102 may include other hardware components (not shown), such as memory devices, graphics processing units (GPU), peripheral I/O, etc.

HPM 102 may also include one or more smart devices 112, such as a Smart Network Interface Card (SmartNIC), which is a programable device used t10 improve data center networking performance, security, features, and flexibility. Other smart devices 112 may include, for example, data processing units (DPU) and infrastructure processing units (IPU).

DC-MHS provides a family of specifications to enable interoperability between datacenter and enterprise infrastructure by providing consistent interfaces and form factors among modular building blocks. For example, the Open Compute Project® is developing following HPM specifications. The Modular Hardware System FulL Width Specification (M-FLW), which is an HPM form factor specification that is optimized for using the full width of a standard rack-mountable server. The Modular Hardware System Partial Width Density Optimized Specification (M-DNO), which is an HPM specification that is targeted to partial width, such as half-width or three-quarters-width, form factors.

The DC-SCM design simplifies the deployment of HPMs and increases the efficiency for time to market deployment for new systems. The DC-SCM has a standardized pinout and definition, which provides common boot, monitoring, control, and remote debug for diverse platforms.

DC-SCI 103 supports several PCIe bus options between DC-SCM 101 and HPM 102, including PCIe Gen 2.0 up to PCIe Gen 5.0 x1 interface, SPI interfaces, NC-SI RMII-based transport (RBT) interface, LTPI, eSPI bus, and I2C/I3C bus among others.

DMTF (formerly known as the Distributed Management Task Force) creates open manageability standards including the Security Protocols and Data Models (SPDM) standard, which enables authentication, attestation, and key exchange to enable and enhance infrastructure security. SPDM defines messages, data objects, and sequences for performing message exchanges between devices over a variety of transport and physical media. The description of message exchanges includes authentication and provisioning of hardware identities, measurement for firmware identities, session key exchange protocols to enable confidentiality with integrity protected data communication and other related capabilities.

Data center administrators require components to establish trust, and to reestablish trust over time, with other components before securely communicating. SPDM provides an authentication mechanism to establish trust between two endpoints. SPDM enables the creation of a session to exchange secured messages between the endpoints. The components may include encompass a number of component types, including PCIe adapters, BMCs, authentication components, CPUs, and components that are attached over I2C or other buses. SPDM enables authentication and secure communication by retrieval of a public key certificate from a component and using a protocol to challenge the component to prove that it is the component whose identity is uniquely described by that certificate. SPDM allows retrieval of a signed measurement payload of mutable components from a component. The measurements may represent a firmware revision, component configuration, the Root of Trust for Measurements, hardware integrity, etc. SPDM provides negotiation of session keys with a component, thereby enabling secured message exchanges with that component.

The Platform Management Components Intercommunication (PMCI) working group of the DMTF prepared the Security Protocol and Data Model (SPDM) Specification (DSP0274) version 1.2.1 dated Jun. 23, 2022, defines messages, data objects, and sequences for performing message exchanges between devices over a variety of transport and physical media. The SPDM Specification sets forth a messaging protocol that defines a request-response messaging model between two endpoints to perform the message exchanges outlined in SPDM message exchanges. The content of the Security Protocol and Data Model (SPDM) Specification (DSP0274) version 1.2.1, including the SPDM message exchanges, are hereby incorporated by reference herein in its entirety.

The 802.1X protocol is an IEEE standard for port-based network access control (PNAC) on wired and wireless access points. The 802.1X standard is available from The Institute of Electrical and Electronics Engineers, Inc. as IEEE Standard for Local and Metropolitan Area Networks—Port-Based Network Access Control, IEEE Std 8012.1X-2020, the contents of which are incorporated by reference herein in their entirety. A Port-based network access control regulates access to the network, guarding against transmission and reception by unidentified or unauthorized parties, and consequent network disruption, theft of service, or data loss. In another embodiment PNAC can also be used to regulate the enablement and filtering of passthrough traffic on Network Controller Sideband Interface (NC-SI) channels. 802.1X defines authentication controls for any user or device trying to access a LAN or WLAN. Components of IHS 100, such as smart devices 112, may use 802.1X for authentication. Authentication using the 802.1X protocol involves three parties: a supplicant, an authenticator, and an authentication server. The supplicant is a client device, such as smart devices 112, that want to attach to BMC/iDRAC 104. The supplicant may also refer to software running on smart devices 112, which provides credentials to the authenticator. The authenticator is a network device, such as BMC/iDRAC 104, that provides a data link between the client and the network. The authenticator allows or blocks network traffic from the supplicant. The authentication server is a trusted server that responds to requests for network access. The authentication server software may run on the authenticator hardware In some cases. For IHS 100, BMC/iDRAC 104 functions as both the authenticator and the authenticator server. The authentication server tells the authenticator whether a connection to the supplicant is allowed.

The authentication server typically runs software supporting the RADIUS and Extensible Authentication Protocol (EAP) protocols. RADIUS (Remote Authentication Dial-In User Service) is a networking protocol for authorizing and authenticating devices that access a remote network. The EAP authentication protocol is used in connections that can support multiple authentication mechanisms. IEEE 802.1x is based on EAP and is referred to as EAPoL (EAP over LAN). EAPoL is an encapsulation protocol used between the supplicant and the authenticator.

In IHS 100, the smart devices 112, such as SmartNIC devices, establish a session over private network communication with BMC/iDRAC 104 to support features such as advanced inventory, configuration, smart device firmware update, smart device operating system provisioning, etc. These sessions are established using SPDM and EAP. After SPDM mutual authentication, BMC/iDRAC 104 assigns or provisions an EAP supplicant identity certificate to the smart devices 112. The BMC/iDRAC 104 acts as the authentication server to facilitate secure access via 802.1X PNAC to smart devices 112 using an SPDM alias certificate (AliasCert) model. The AliasCert model is used to establish mutual trust and privilege mapping between BMC/iDRAC 104 and smart device 112.

Multiple two-way connections may be established between smart devices 112 and BMC/iDRAC 104 for firmware updates, operating system provisioning, and other administrative request processing using secure sessions for enhanced security. In other arrangements, private secure network connections may be established between smart devices 112 with a smart device 112 acting as an authentication proxy and forwarding requests to BMC/iDRAC 104, which grants connections to other smart devices 112.

Current systems are less secure because the BMC assigns IPv6 addresses to smart devices via a DHCPv6 server with minimal or no authentication. Existing OAuth token-based solutions provide one-way authentication where a smart device is expected or assumed to trust the BMC. The current systems have a single shared session between the BMC and smart device for processing updates, provisioning, and other requests, which opens the possibility of accessing transactions by tapping via a controller hub.

Figure 2:
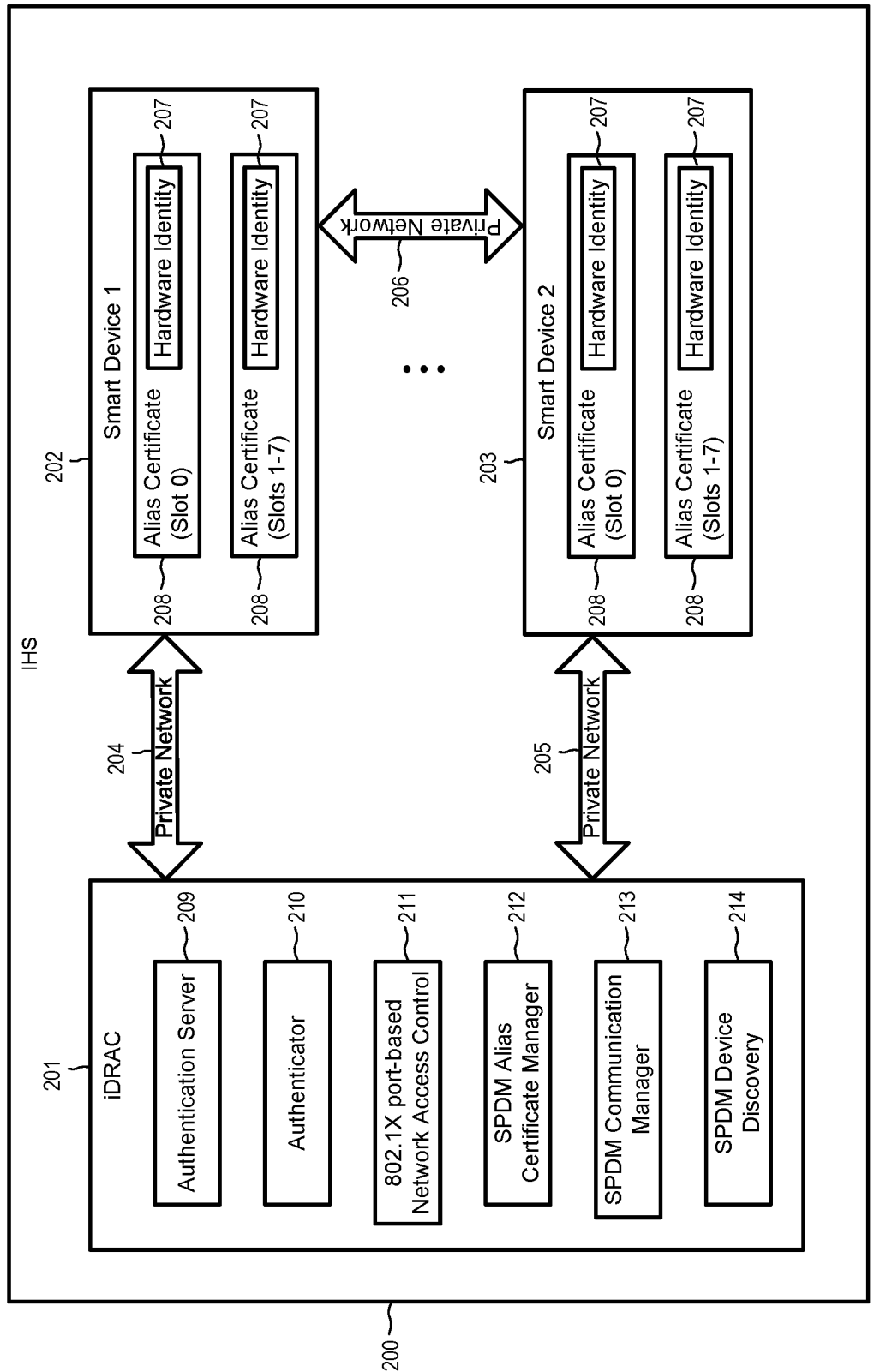
FIG. 2 is a block diagram illustrating elements of a data center system, which may be components of a server or an Information Handling System (IHS)

FIG. 2 is a block diagram illustrating elements of a data center system 200, which may be components of a server or an Information Handling System (IHS), for example. A BMC, such as iDRAC 201, is in communication with a number of smart devices 202, 203 via private networks 204, 205. Smart devices 202, 203 may also communicate directly with each other via private network 206. In one arrangement, smart devices 202, 203 are Smart NICs, data processing units (DPU), and/or infrastructure processing units (IPU). Networks 204, 205, 206 may be part of a secure control interface (DC-SCI) in one embodiment.

SPDM-capable devices that support identity authentication use a certificate chain containing an ordered list of certificates. A complete certificate chain has (i) a first certificate either signed by a Root Certificate (a certificate that specifies a trust anchor) or is a Root Certificate itself, (ii) subsequent certificates signed by the preceding certificate, and (iii) a final certificate containing a public key used to authenticate the SPDM device. The final certificate is called the leaf certificate. Certificate chains are stored in logical locations called slots. Slots are numbered zero through seven. Each slot is either empty or contains one complete certificate chain. The certificate chains follow either a DeviceCert model or an AliasCert model. When queried, the certificate model type is identified in the SPDM CAPABILITEIS response message. The certificate chain includes a device certificate that binds an asymmetric public/private key pair to a particular device and associates the device with additional metadata. The device certificate includes hardware identity information. Smart devices 202, 203 in the example of FIG. 2 use the AliasCert model with hardware identities 207 stored in certificate chain slots 208.

iDRAC 201 runs a number of software programs or daemons in the background. These programs handle various SPDM- and 802.1X-related processes such as an authentication server role 209, authenticator role 210, 802.1X PNAC functions 211, SPDM alias certificate management 212, SPDM communication management 213, and SPDM device discovery 214.

In the DC-MHS environment, smart devices 202, 203 are considered as the supplicant role for client device that wish to attach to iDRAC 201 via private network channel 204, 205 to support features such as advanced inventory, configuration, firmware update, operating system provisioning, etc. With 802.1X port-based authentication, the supplicant (i.e., smart devices 202, 203) must initially provide the required credentials to the authenticator (i.e., iDRAC 201). In the example provisioning model shown in FIG. 2, iDRAC 201 acts both the authenticator and the authentication server for 802.1X.

During an SPDM discovery process, iDRAC 201 receives the smart devices' capabilities, unique serial number via the Field Replaceable Unit (FRU) data model, resolves Fully Qualified Device Descriptor (FQDD) mapping (i.e., identify a particular component within a system), and gets the hardware identity certificate.

iDRAC 201 validates the certificates and capabilities. Then, iDRAC 201 deploys the required credentials to the respective smart device 202, 203 locked against the hardware identity certificate, FQDD and unique serial number. iDRAC 201 uses the SPDM SET_CERTIFICATE request message to deploy these credentials in the form of an SPDM Alias digital certificate on any of the free slots (i.e., slots 1 to 7 other than slot 0).

iDRAC 201 sends an SPDM GET_CSR request message to retrieve a Certificate Signing Request (CSR) from smart devices 202, 203. The CSR is populated with a combination of attributes provided by the Requester (i.e., iDRAC 201) via the RequesterInfo field. Device manufacturer extensions (e.g., OEM OIDs) are encoded using the Attributes type. iDRAC 201 acts as the SPDM Requester and includes FQDD and the unique serial number as part of the RequesterInfo field. iDRAC 201 also acts as the Certificate Authority and signs the CSR. iDRAC 201 issues the SPDM SET_CERTIFICATE request message inside a secure session for slot 1-7 provisioning and passes the CertChain variable containing a partial certificate chain from the root certificate authority (CA).

Once the supplicant (i.e., smart devices 202, 203) has the embedded alias certificate with 802.1X credentials, smart device 202, 203 requests a new connection to iDRAC 201. iDRAC 201 revalidates the credentials against the hardware identity certificate, FQDD, and unique serial number and grants the connection request.

Within a connection, the smart devices 202, 203 can establish one or more secure sessions as an SPDM Requester. These secure sessions are considered to be a part of the same connection. Secure sessions can terminate, or additional sessions can be established at any time. Multiple two-way secure sessions are used between smart devices 202, 203 and iDRAC 201 for firmware updates and operating system provisioning and other administrative request processing.

A secure private network connection 206 between smart devices 202, 203 is established by iDRAC 201 provisioning the respective credentials to both smart devices 202, 203 where one of the smart devices 202, 203 acts as authenticator proxy and forwards the request to iDRAC 201, which grants the connection.

Figure 3:
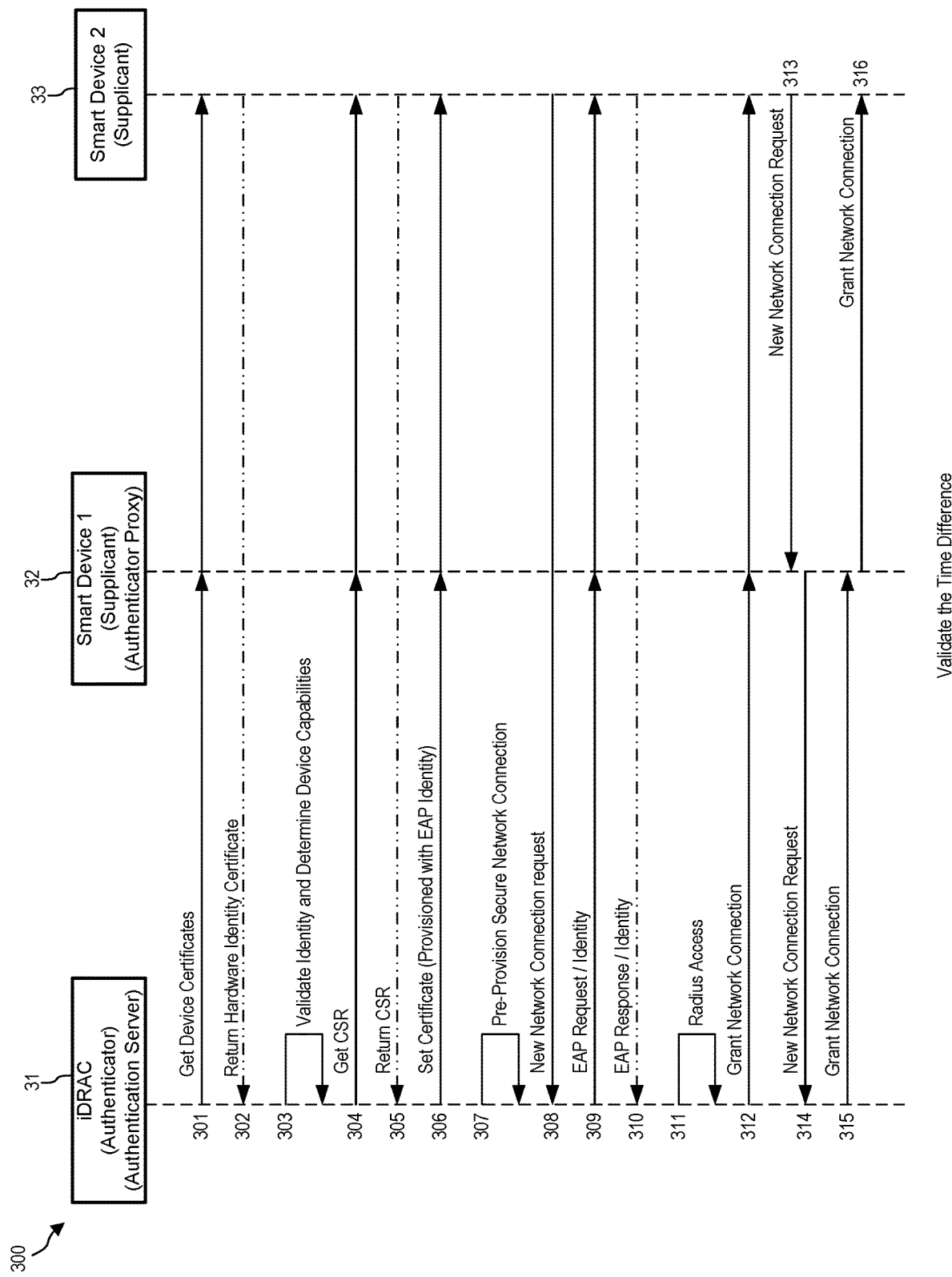
FIG. 3 illustrates a message flow that is exchanged between an iDRAC and smart devices to establish a secure network connection.

FIG. 3 illustrates a message flow that is exchanged between an iDRAC 31 and smart devices 32, 33. In one embodiment, iDRAC 31 and smart devices 32, 33 are components of a server or IHS in a data center. This message flow may include SPDM messages where iDRAC 31 acts as the Requester and smart devices 32, 33 act as Responders. iDRAC 31 performs the authenticator and authentication server roles for the 802.1X PNAC standard. Smart device 32 performs the supplicant role and may also act as an authenticator proxy. Smart device 33 performs the supplicant role and may be authenticated directly by iDRAC 31 or indirectly via smart device 32.

Message 301 is a request from iDRAC 31 to devices 32, 33 to provide device certificates. This may be an SPDM GET_CERTIFICATE message, for example, in which iDRAC 31 requests that the devices provide a certificate chain from a specified slot number. In messages 302, the devices 32, 33 each return their hardware identity certificate. This may be an SPDM CERTIFICATE response message that includes an id-DMTF-hardware-identity OID along with metadata. iDRAC 31 may exchange additional SPDM request/response messages (not shown) to determine capabilities of each device 32, 33. These may be SPDM GET_CAPABILITIES request messages and SPDM CAPABILITIES response messages, for example.

In step 303, iDRAC 31 validates identify of each smart device 32, 33 and determines the capabilities of the devices.

Message 304 is an SPDM GET_CSR request message sent by iDRAC 31 to smart devices 32, 33 as a certificate signing request. Message 305 is an SPDM CSR response message returned to iDRAC 31 from smart devices 32, 33. CSR message 305 is populated with attributes such as OEM OIDs, FQDD, and a unique serial number.

Message 306 is an SPDM SET_CERTIFICATE request message sent by iDRAC 31 for slot 1-7 provisioning. iDRAC 31 passes the CertChain variable containing a partial certificate chain from the root certificate authority (CA).

In step 307, iDRAC 31 pre-provisions a secure network connection, such as on a private network, for smart devices 32, 33.

In messages 308, smart devices 32 and/or 33 request a new network connection from iDRAC 31. In one embodiment, this may be an EAPOL-Start packet sent to iDRAC 31 to initiate 802.1X authentication. iDRAC 31 then sends an EAP-Request/Identity packet 309 to ask for the client username of smart device 32, 33. In response, smart device 32, 33 sends the username in an EAP-Response/Identity packet 310 to iDRAC 31.

In step 311, iDRAC 31, which is performing both the Authenticator and Authentication Server functions, authenticates smart devices 32, 33. Referring to FIG. 2, for example, an authenticator daemon 210 may exchange Radius messages with an authentication server daemon 209. These messages may include, for example, RADIUS Access-Request, RADIUS Access-Challenge, RADIUS Access-Accept, and MD5-Challenge messages. If the authentication server daemon 209 considers smart devices 32, 33 as a valid client, iDRAC 31 then sends an EAP-Success packet to the smart devices 32, 33 and sets the controlled port or NC-SI channel to an authorized state so that devices 32, 33 can access the network 312.

The discussion of FIG. 3 refers to smart device 32, 33 simultaneously requesting network access. It will be understood that each device 32, 33 may request access separately at different times and that iDRAC 31 will respond to each device independently and will grant independent network access.

In another embodiment, smart device 32 acts as authenticator proxy for smart device 33 when smart device 32 has been authenticated to iDRAC 31 but smart device 33 has not yet been authenticated by iDRAC 31. Smart device 33 initiates a secure private network connection by sending a new network connection request message 313 to smart device 32, which forwards that request in a separate message 314 to iDRAC 31. After identifying and authenticating smart device 33, iDRAC 31 sends message 315 to smart device 32 granting a network connection to smart device 33. Smart device 32 then forwards message 316 to smart device 33 granting the network connection. This may be a secure private network connection between smart devices 32, 33, for example, or a connection between iDRAC 31 and smart device 33.

In one embodiment, an IHS comprises a host processor module configured to host at least one smart device and a secure control module configured to host a baseboard management controller. The baseboard management controller validates identities and determines capabilities of the at least one smart device using SPDM messages, sends a network access identity to the at least one smart device using an SPDM message, receives a request for a network connection from the at least one smart device, performs authentication server functions to approve the network connection request, and sends a message to the at least one smart device indicating that a port or NC-SI channel is authorized for network access. The request for a network connection includes the network access identity. The baseboard management controller validates identities of the at least one smart device using an SPDM GET_CERTIFICATE message. The SPDM SET_CERTIFICATE message includes an alias certificate with IEEE 802.1X credentials for the at least one smart device. The baseboard management controller determines capabilities of the at least one smart device using an SPDM GET_CAPABILITIES request message. The network access identity is sent in an SPDM SET_CERTIFICATE message. The authentication server functions comprise processing RADIUS networking protocol messages by the baseboard management controller. The RADIUS networking protocol messages comprise messages defined in an IEEE 802.1X standard. The message indicating that a port or NC-SI channel is authorized for network access is an IEEE 802.1X standard EAP-Success packet.

In another embodiment, an IHS comprises a host processor module configured to host two or more smart devices and a secure control module configured to host a baseboard management controller. The baseboard management controller comprises at least one processor coupled to at least one memory, the at least one memory having program instructions stored thereon that, upon execution by the at least one processor, cause the baseboard management controller to establish a first secure private network connection to a first smart device using SPDM messages, receive a request for a second private network connection from the first smart device, wherein the first smart device is acting as an authenticator proxy for a second smart device, perform authentication server functions to approve the second private network connection request, and send a message to the first smart device indicating that a port or NC-SI channel is authorized for the second private network connection to be used by the second smart device. The secure private network connection is established using messages defined in an IEEE 802.1X standard. The authentication server functions comprise performing both an Authenticator role and an Authentication Server role by the baseboard management controller as those roles are defined in an IEEE 802.1X standard. The authentication server functions comprise processing RADIUS networking protocol messages by the baseboard management controller. The first and second smart devices are selected from a SmartNIC device, a DPU, and an IPU.

In another arrangement, a computer program product comprises a non-transitory computer readable storage medium having program instructions stored thereon that, upon execution by an IHS, cause the IHS to validate identities and determine capabilities of the at least one smart device using SPDM messages, send a network access identity to the at least one smart device using an SPDM message, receive a request for a network connection from the at least one smart device, wherein the request includes the network access identity, perform authentication server functions to approve the network connection request, and send a message to the at least one smart device indicating that a port or NC-SI channel is authorized for network access. The identities of the at least one smart device are validated using an SPDM GET_CERTIFICATE message. The capabilities of the at least one smart device are determined using an SPDM GET_CAPABILITIES request message. The network access identity is sent in an SPDM SET_CERTIFICATE message. The SPDM SET_CERTIFICATE message includes an alias certificate with IEEE 802.1X credentials for the at least one smart device. The authentication server functions comprise processing RADIUS networking protocol messages by the baseboard management controller. The message indicating that a port NC-SI channel is authorized for network access is an IEEE 802.1X standard EAP-Success packet.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. An Information Handling System (IHS), comprising:
a host processor module configured to host at least one smart device;
a secure control module configured to host a baseboard management controller;
wherein the baseboard management controller comprises at least one processor coupled to at least one memory, the at least one memory having program instructions stored thereon that, upon execution by the at least one processor, cause the baseboard management controller to:
validate identities and determine capabilities of the at least one smart device using Security Protocol and Data Model (SPDM) messages;
send a network access identity inside a secure session to the at least one smart device using at least one SPDM SET_CERTIFICATE message comprising an alias certificate with IEEE 802.1X credentials, the at least one SPDM SET_CERTIFICATE message configured to cause the at least one smart device to store the alias certificate in a free certificate chain slot other than slot zero;
receive a request from the at least one smart device for a secure network connection with security based at least in part on the alias certificate, wherein the secure network connection is requested to be on a controlled port or controlled Network Controller Sideband Interface (NC-SI) channel, and wherein the request includes the network access identity;
determine if the request from the at least one smart device for the secure network connection is approved, based at least in part on performing authentication server functions;
in response to a determination that the request from the at least one smart device for the secure network connection is approved, set the controlled port or controlled NC-SI channel to an authorized state; and
send a message to the at least one smart device indicating that the controlled port or NC-SI channel is authorized for network access by the at least one smart device.

2. The IHS of claim 1, wherein the baseboard management controller validates identities of the at least one smart device using an SPDM GET_CERTIFICATE message.

3. The IHS of claim 1, wherein the baseboard management controller determines capabilities of the at least one smart device using an SPDM GET_CAPABILITIES request message.

4. The IHS of claim 1, wherein the authentication server functions comprise processing Remote Authentication Dial-In User Service (RADIUS) networking protocol messages by the baseboard management controller.

5. The IHS of claim 4, wherein the RADIUS networking protocol messages comprise messages defined in an IEEE 802.1X standard.

6. The IHS of claim 1, wherein the message indicating that the controlled port or controlled NC-SI channel is authorized for network access is an IEEE 802.1X standard EAP-Success packet.

7. An Information Handling System (IHS) comprising:
a host processor module configured to host two or more smart devices;
a secure control module configured to host a baseboard management controller; and
wherein the baseboard management controller comprises at least one processor coupled to at least one memory, the at least one memory having program instructions stored thereon that, upon execution by the at least one processor, cause the baseboard management controller to:
establish a first secure private network connection to a first smart device and a second smart device using Security Protocol and Data Model (SPDM) messages, wherein each SPDM message comprises an SPDM SET_CERTIFICATE message configured to cause the first smart device and the second smart device to store an alias certificate in a free certificate chain slot other than slot zero;
receive a request from the first smart device to establish a second secure private network connection between the baseboard management controller and the second smart device, wherein the received request is forwarded from the second smart device to the baseboard management controller in a separate message by the first smart device, wherein the first smart device is acting as an authenticator proxy for the second smart device, and wherein the requested second secure private network connection security is based at least in part on the alias certificate;
perform authentication server functions to determine if the second secure private network connection request is approved; and
in response to a determination that the second private network connection request is approved, send a message to the first smart device indicating that a controlled port or controlled Network Controller Sideband Interface (NC-SI) channel is authorized for the second secure private network connection to be used by the second smart device.

8. The IHS of claim 7, wherein the first secure private network connection and the second secure private network connection are established using messages defined in an IEEE 802.1X standard.

9. The IHS of claim 7, wherein the authentication server functions comprise performing both an Authenticator role and an Authentication Server role by the baseboard management controller as those roles are defined in an IEEE 802.1X standard.

10. The IHS of claim 7, wherein the authentication server functions comprise processing Remote Authentication Dial-In User Service (RADIUS) networking protocol messages by the baseboard management controller.

11. The IHS of claim 7, wherein the first and second smart devices are selected from a SmartNIC device, a data processing unit (DPU), and an infrastructure processing unit (IPU).

12. A computer program product comprising a non-transitory computer readable storage medium having program instructions stored thereon that, upon execution by an Information Handling System (IHS), cause the IHS to:
validate identities and determine capabilities of at least one smart device using Security Protocol and Data Model (SPDM) messages;
send a network access identity inside a secure session to the at least one smart device using at least one SPDM SET_CERTIFICATE message comprising an alias certificate with IEEE 802.1X credentials, the at least one SPDM SET_CERTIFICATE message configured to cause the at least one smart device to store the alias certificate in a free certificate chain slot other than slot zero;
receive a request from the at least one smart device for a secure private network connection with security based at least in part on the alias certificate, wherein the secure private network connection is requested to be on a controlled port or controlled Network Controller Sideband Interface (NC-SI) channel, and wherein the request includes the network access identity;
determine if the request from the at least one smart device for the secure private network connection is approved, based at least in part on performing authentication server functions; and
in response to a determination that the secure private network connection request is approved, send a message to the at least one smart device indicating that a controlled port or controlled Network Controller Sideband Interface (NC-SI) channel is authorized for network access by the at least one smart device.

13. The computer program product of claim 12, wherein the identities of the at least one smart device are validated using at least one SPDM GET_CERTIFICATE message.

14. The computer program product of claim 12, wherein the capabilities of the at least one smart device are determined using at least one SPDM GET_CAPABILITIES request message.

15. The computer program product of claim 12, wherein the authentication server functions comprise processing Remote Authentication Dial-In User Service (RADIUS) networking protocol messages by the IHS.

16. The computer program product of claim 15, wherein the message indicating that the controlled port or controlled NC-SI channel is authorized for network access is an IEEE 802.1X standard EAP-Success packet.

* * * * *